May 27, 1958  R. L. JAESCHKE  2,836,271
CONSTANT HORSEPOWER CONTROLLED SPEED VARIABLE SPEED DRIVE
Filed June 24, 1954  2 Sheets-Sheet 1

INVENTOR.
RALPH L. JAESCHKE
BY
ATTORNEYS

INVENTOR.
RALPH L. JAESCHKE

2,836,271
CONSTANT HORSEPOWER CONTROLLED SPEED VARIABLE SPEED DRIVE

Ralph L. Jaeschke, Kenosha, Wis., assignor to Eaton Manufacturing Company, Cleveland, Ohio, a corporation of Ohio Application June 24, 1954, Serial No. 439,115

16 Claims. (Cl. 192—3.2)

This invention relates to variable speed prime mover or motor drives and more particularly to drives capable of exerting increased torque, over that provided by the motor, at lower output speeds of the drive.

Broadly the invention comprehends the provision of a drive comprising a prime mover, such as an electric motor, a speed controlled coupling and an automatic torque converter arranged in series driving relation providing for a controlled constant horsepower output of the drive.

In the past, gear boxes of one sort or another have been used in combination with a motor or other type of prime mover and a speed controlled coupling in order to increase horsepower at lower speeds of the prime mover. Furthermore, such arrangement is not automatic and is additionally cumbersome and unsatisfactory except in a few isolated cases.

Among the principal objects of the invention is the provision of a constant horsepower output drive employing a motor or the like as a prime mover that:

a. Provides increased torque at lower speeds of output of the drive;

b. Provides a constant horsepower output for all speeds of operation of the drive;

c. Provides a compact arrangement of a speed controlled coupling and an automatic torque converter driven in series from the motor; and, d. Includes in addition to the prime mover, a speed controlled electromagnetic coupling and a hydraulic torque converter, wherein upon the speed controlled setting of the output of the coupling to a proportionate speed to the prime mover a constant horsepower output of the drive is always maintained.

Figure 1:
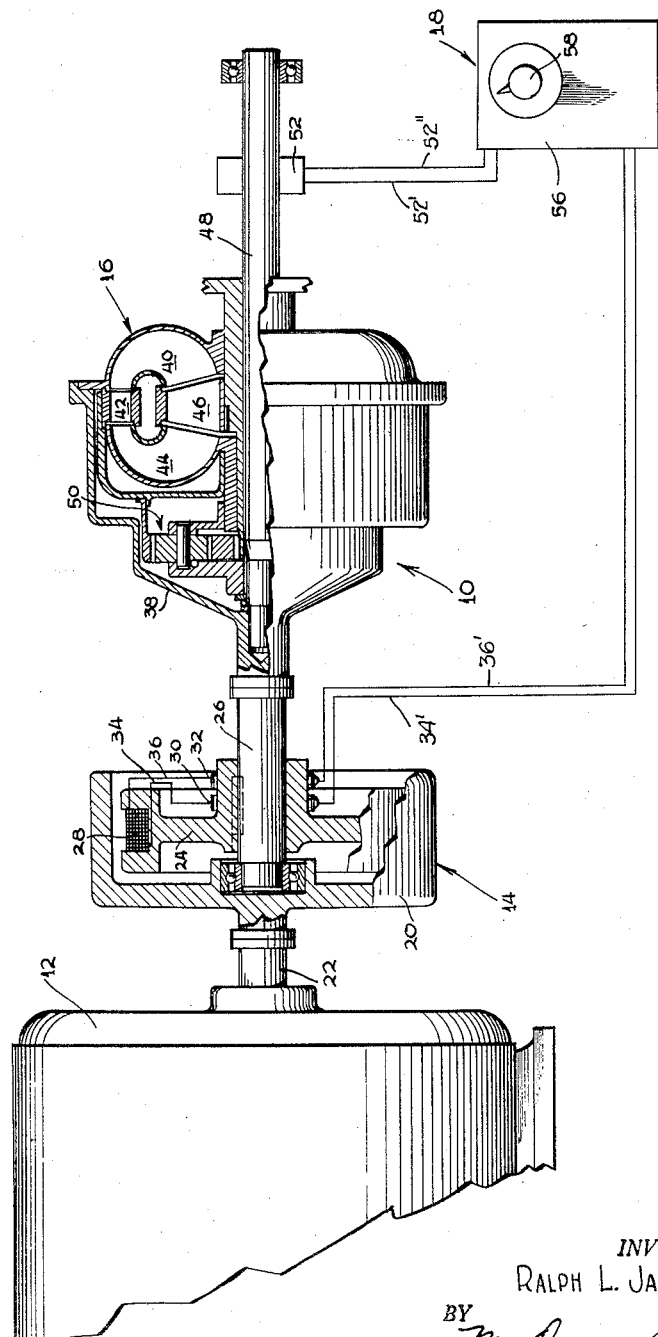
Figure 2:
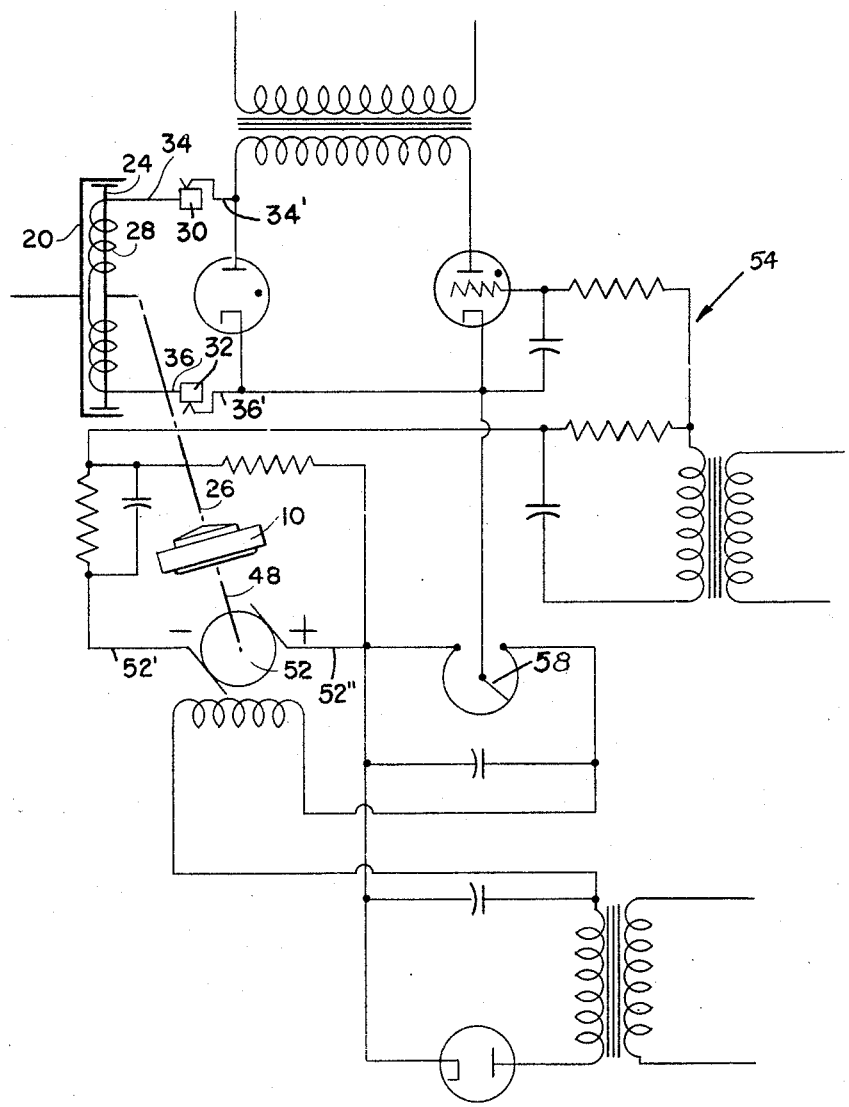

Other objects and advantages of the invention will appear from the following description taken in connection with the drawings forming a part of the specification, and in which:

Fig. 1 is a partly broken away partly cross-sectionalized side elevation view of a drive, constituting the invention; and, Fig. 2 is a schematic diagram of a speed control circuit for the coupling of Fig. 1.

Similar reference characters indicate corresponding parts throughout the several views of the drawings.

This invention is directed at the provision of a drive capable of providing for a constant horsepower output over a wide range of controlled output speeds wherein the motive means of the drive is a constant speed prime mover such as an electric induction motor. A drive of this type is suitably adaptable to engine lathes, milling machines and the like where it is desirable to have automatic increase in torque with reduction in speed.

As a means of obtaining a desired drive to accomplish the aforesaid, it is proposed to use a standard electric induction motor, an eddy current coupling and a hydraulic torque converter having a relatively wide torque range and high efficiency at top output speed, arranged in series driving relation and electronic speed control means for the eddy current coupling.

Referring to the drawings for more specific details of the invention 10 represents generally a constant horsepower controlled speed variable speed drive.

Drive 10 as disclosed by Fig. 1 includes a standard constant speed A. C. electric motor 12, as a prime mover, an eddy current electromagnetic coupling 14, a hydraulic torque converter 16, and an electronic speed control means 18, for the coupling.

Eddy current coupling 14 includes an input drum member 20 fixedly connected to an output shaft 22 of motor 12, a rotor or driven member 24, cooperative with drum member 20, and an output shaft 26 fixedly secured to rotor 24. An energizable magnetic coil 28 is supplied controlled current from means 18 by way of current conducting brushes 30 and 32 connected through suitable current conducting wires 34 and 36 connected to opposite ends of coil 28.

Hydraulic torque converter 16 is of the type disclosed in Robert C. Russell Patent No. 2,616,309 for Transmission having a wide torque range and high efficiency at top output speed. Torque converter 16 includes an input member 38 directly coupled to output shaft 26 of coupling 14, an impeller member 40 connected to member 20, first and second turbines or runner members 42 and 44, reaction member 46, an output shaft 48 and a planetary gear assembly 50 interconnected between the turbines and output shaft.

Eddy current coupling 14 is preferably disposed in series intermediate the motor 12 and converter 16 such that it is only necessary in this arrangement to handle motor torque rather than the torque output of converter 16 as would be the case if it were driven from the output of the converter. Accordingly, the size of the coupling is held to a minimum and economy of overall structure in the drive is attained.

Electronic speed control means 18 includes a speed control generator 52 driven from output shaft 48 with current connection thereof with an electronic circuit 54 of means 18. As indicated by Fig. 1, circuit 54, disclosed in detail in Fig. 2 is enclosed in a cabinet 56 having a speed control setting dial 58 thereon. Circuit 54 is merely representative of one form of circuit applicable to the output speed control of coupling 14 and is of the type more fully disclosed, defined and claimed in Ralph L. Jaeschke Patent No. 2,659,832 for Speed Control System for Electromagnetic Coupling.

Assuming that the torque converter 16 is capable of a maximum torque multiplication of 3 to 1 when output shaft 48 is stalled and assuming an efficiency of 75% for the torque converter, a 1⅛ to 1 torque increase can be obtained at output shaft 48 at say an output speed thereof approximately equal to one-half the speed of motor 12. It will thus be seen that with dial 58 set to control output shaft 48 of drive 10 to regulate, by way of the electronic control means 10, at one-half the motor speed, shaft 48 can be loaded to a point where the torque is one and one-eighth times the electric motor, because of the effective torque multiplication of converter 16.

When speed control setting dial 58 is set for ¾ of motor speed as compared to ½ of motor speed, the output shaft 48 could so be loaded so that the horsepower output would be the same as it was at ½ motor speed, such for example if the output was 25 horsepower at 900 R. P. M., for a 1800 R. P. M. motor, the output at ¾ motor speed or 1350 R. P. M. would remain at 25 horsepower, with a corresponding proportionately lower torque multiplication through converter 16. In view of the automatic adjustment of converter 16 to the requirements of the horsepower demand put out through shaft 48, no control of the converter is necessary for variations in speed control of the shaft 48.

It is conceivable that due to losses of efficiency in transmission through the series driving arrangement of the various component mechanisms of drive 10 that the electric motor horsepower will have to be based on the horsepower maximum desired at any of the lower speeds of controlled setting of the output of drive 10 plus what is necessary to make up for said losses.

Further explaining the operation of drive 10 and assuming the output shaft 48 is operating at 500 R. P. M. with only a power demand of 25% torque, the input member 38 of the converter would be operating at slightly more than 500 R. P. M. Likewise with the output shaft 26 of the coupling being connected to the input member 38 of the coupling, the rotor 24 of the coupling will be operating at the same speed as the impeller member 40 of the torque converter. At the same time, the drum 20 of the coupling, being directly connected to output shaft 22 of the motor, will operate at motor speed. At this stage of operation the losses will all be in the coupling and since only 25% torque demand is involved the energy dissipation in the coupling would be small. Upon increasing the torque load to 100% while maintaining the same operating speed at shaft 48, the eddy current coupling by reason of speed control means 18 would respond so that the speed of the input member 38 and impeller 40 of the torque converter would be increased to approximately 800 or 900 R. P. M., depending on the efficiency of the torque converter. At this time both the coupling and torque converter would be dissipating energy. As the torque load is further increased to say 200%, the coupling by reason of control means 18 responds to hold shaft 48 at 500 R. P. M. while increasing the input member 38 of the torque converter to approximately 1500 R. P. M. At this time practically all the energy dissipation is in the torque converter and very little in the coupling. Should the speed control be turned toward zero a like functional operation as herein defined would occur in reverse.

Although not so disclosed in connection with torque converter 16 and coupling 14, it will generally be necessary to provide suitable air or liquid cooling means for removing the heat generated in the coupling and cooling means for absorbing the heat generated in the torque converter.

Although the various component mechanisms of drive 10 are specifically disclosed and defined hereinbefore, it is conceivable that other kinds of prime movers could be substituted for motor 12, such as diesel engines with limited speed range, that various forms of automatic torque converters could be substituted for hydraulic torque converter 16 and that instead of eddy current coupling 14 other like speed controllable couplings, such as magnetic fluid magnetic couplings, could be used. Accordingly, and in the light hereof, the appended claims are to be so interpreted.

What I claim is:

1. A drive comprising a constant speed prime mover, a speed controlled coupling having its input connected to the output of the prime mover and an automatic torque converter having its input connected to the output of the coupling and wherein upon the speed controlled setting of the output of the coupling, to a proportionate speed of the prime mover, a constant horsepower output of the drive is maintained.

2. A drive comprising a constant speed prime mover including an output member, an automatically variable torque multiplication mechanism including input and output members, and a speed controlled coupling including input and output members, said input member of the coupling being coupled to the output member of the prime mover, and said input member of the mechanism being coupled to the output member of the coupling.

3. A drive according to claim 2 wherein the prime mover is an electric motor.

4. A drive according to claim 3 wherein the mechanism is a hydraulic torque converter.

5. A drive according to claim 3 wherein the coupling is an electromagnetic clutch.

6. A drive according to claim 2 wherein the mechanism is a hydraulic torque converter.

7. A drive according to claim 6 wherein the coupling is an electromagnetic clutch.

8. A drive according to claim 2 wherein the coupling is an electromagnetic clutch.

9. A drive comprising a constant speed prime mover including an output member, an automatically variable torque multiplication mechanism including input and output members, a speed controllable coupling including input and output members, said prime mover output member determining the maximum speed of said output member of said coupling and means driven from said mechanism output member controlling the speed of said output member of said coupling up to the speed of said prime mover output member, said input of the coupling being coupled to the output of the prime mover and said input member of the mechanism being coupled to the output of the coupling.

10. A drive according to claim 9 wherein the coupling is an electromagnetic clutch and the means, for controlling the speed of operation of said output member of said coupling, regulates the current supply to the coupling.

11. A drive according to claim 10 wherein the speed controlling means is electronic and includes a speed control generator driven from the output member of the clutch.

12. A drive according to claim 11 wherein the clutch is of the eddy current type.

13. A drive comprising a prime mover including an output member, a hydraulic torque converter including input and output members, an electromagnetic coupling including input and output members, and an electronic speed control means including a generator driven from the output member of the mechanism and an electronic circuit connected therewith, said input member of the coupling being coupled to the output member of the prime mover, said input member of the converter being coupled to the output member of the coupling and said electronic speed control means controlling the output speed of said coupling up to the speed of said prime mover output member.

14. A drive according to claim 13 wherein the prime mover is an electric motor and wherein the control means includes means for setting the desired speed of operation of the output of the coupling.

15. A drive according to claim 14 wherein the electric motor is of the constant speed type.

16. A drive comprising a prime mover including an output member, an automatically variable torque multiplication mechanism including input and output members, a speed controllable coupling including input and output members, and means driven from the output member of the mechanism for controlling the speed of operation of the output member of the coupling up to the speed of said prime mover output member, said input of the coupling being coupled to the output of the prime mover and said input member of the mechanism being coupled to the output member of the coupling, said speed controlling means being electronic and including a speed control generator driven from the output member of said mechanism.

References Cited in the file of this patent

UNITED STATES PATENTS

| 1,587,645 | Hicguet | June 8, 1926 |
| 2,101,606 | Ayres | Dec. 7, 1937 |
| 2,302,714 | Pollard | Nov. 24, 1942 |
| 2,324,693 | Griswold | July 20, 1943 |
| 2,484,616 | Dulaney | Oct. 11, 1949 |

FOREIGN PATENTS

| 132,785 | Sweden | Aug. 12, 1948 |